United States Patent
Ha et al.

(10) Patent No.: US 7,072,426 B2
(45) Date of Patent: Jul. 4, 2006

(54) DEMODULATION APPARATUS AND METHOD IN A COMMUNICATION SYSTEM EMPLOYING 8-ARY PSK MODULATION

(75) Inventors: Sang-Hyuck Ha, Suwon-shi (KR); Min-Goo Kim, Suwon-shi (KR)

(73) Assignee: Samsung Electronics Co., Ltd. (KR)

( * ) Notice: Subject to any disclaimer, the term of this patent is extended or adjusted under 35 U.S.C. 154(b) by 744 days.

(21) Appl. No.: 10/218,918

(22) Filed: Aug. 14, 2002

(65) Prior Publication Data
US 2003/0112900 A1 Jun. 19, 2003

(30) Foreign Application Priority Data
Aug. 14, 2001 (KR) ............... 2001-0048921

(51) Int. Cl.
*H04L 27/22* (2006.01)
(52) U.S. Cl. ............... 375/331; 375/340; 375/341; 329/304
(58) Field of Classification Search ............... 375/271, 375/262, 279, 280, 281, 286, 316, 329, 332, 375/340, 341, 331; 329/304, 305, 310, 329; 714/4, 780, 794
See application file for complete search history.

(56) References Cited

U.S. PATENT DOCUMENTS

| 5,278,871 A | 1/1994 | Rasky et al. |
| 5,867,538 A | 2/1999 | Liu |
| 6,529,559 B1 * | 3/2003 | Reshef ............ 375/262 |
| 6,594,318 B1 * | 7/2003 | Sindhushayana ...... 375/262 |
| 2001/0021233 A1 * | 9/2001 | Jin .................. 375/341 |
| 2002/0131515 A1 * | 9/2002 | Rodriguez ........... 375/262 |

OTHER PUBLICATIONS

Kenneth M. Mackenthun, "Covariance Matrix Properties and Multiple Symbol/Soft Decision Detetion in Slow Flat Rician Fading", Feb. 1, 1995.

* cited by examiner

*Primary Examiner*—Tesfaldet Bocure
*Assistant Examiner*—Naheed Ejaz
(74) *Attorney, Agent, or Firm*—Dilworth & Barrese LLP

(57) ABSTRACT

An 8-ary PSK demodulation apparatus for receiving an input signal $R_k(X_k, Y_k)$ comprised of a $k^{th}$ quadrature-phase component $Y_k$ and a $k^{th}$ in-phase component $X_k$, and for generating soft decision values $\Lambda(s_{k,0})$, $\Lambda(s_{k,1})$, and $\Lambda(s_{k,2})$ for the input signal $R_k(X_k, Y_k)$ by a soft decision means. A calculator calculates $Z_k$ by subtracting a level $|Y_k|$ of the quadrature-phase signal component $Y_k$ from a level $|X_k|$ of the in-phase signal component $X_k$, and outputs the $Z_k$ as a first soft decision value. A first selector selects the $Z_k$ or reverse $-Z_k$, according to an MSB of the quadrature-phase signal component $Y_k$. A second selector selects the $Z_k$ or the reverse $-Z_k$ according to an MSB of the in-phase signal component $X_k$. A third selector selects an output of the second selector or a value "0" according to an MSB of the $Z_k$. A first adder adds $\sqrt{2}Y_k$ to an output of the third selector, and outputs the result value as a third soft decision value. A fourth selector selects an output of the second selector or a value "0" according to the MSB of the $Z_k$. A second adder adds $\sqrt{2}X_k$ to an output of the fourth selector, and outputs the result value as a second soft decision value.

4 Claims, 5 Drawing Sheets

DEMODULATION APPARATUS AND METHOD IN A COMMUNICATION SYSTEM EMPLOYING 8-ARY PSK MODULATION

This application claims priority to an application entitled "Method and Apparatus for Calculating Soft-Decision Value for Multi-Level Modulation" filed in the Korean Industrial Property Office on Aug. 14, 2001 and assigned Serial No. 2001-48921, the contents of which are incorporated herein by reference.

BACKGROUND OF THE INVENTION

1. Field of the Invention

The present invention relates generally to a demodulation apparatus and method in a digital communication system employing multi-level modulation, and in particular, to a demodulation apparatus and method for calculating soft decision values needed as inputs to a channel decoder in a demodulator for a digital communication system employing 8-ary PSK (Phase Shift Keying) modulation.

2. Description of the Related Art

In a digital communication system employing 8-ary PSK modulation, a kind of multi-level modulations, to increase spectral efficiency, a signal encoded by a channel encoder is transmitted after being modulated. A demodulator then demodulates the signal transmitted and provides the demodulated signal to a channel decoder for decoding. The channel decoder performs soft decision decoding in order to correct errors. To do so, the demodulator must have a mapping algorithm for generating soft decision values (or soft values) corresponding to output bits of the channel encoder from a 2-dimensional signal comprised of an in-phase signal component and a quadrature-phase signal component.

The mapping algorithm is classified into a simple metric procedure proposed by Nokia and a dual minimum metric procedure proposed by Motorola. Both algorithms calculate LLR (Log Likelihood Ratio) for the output bits and use the calculated LLR as an input soft decision value of the channel decoder.

The simple metric procedure, a mapping algorithm given by modifying a complex LLR calculation formula into a simple approximate formula, has a simple LLR calculation formula, but LLR distortion caused by the use of the approximate formula leads to performance degradation. The dual minimum metric procedure, a mapping algorithm of calculating LLR with a more accurate approximate formula and using the calculated LLR as an input soft decision value of the channel decoder, can make up for performance degradation of the simple metric procedure to some extent. However, compared with the simple metric procedure, this procedure needs increased calculations, thus causing a considerable increase in hardware complexity.

SUMMARY OF THE INVENTION

It is, therefore, an object of the present invention to provide an apparatus and method for simplifying obtaining input soft values of a channel decoder, calculated by the dual minimum metric procedure, without a mapping table or complex processing needed to obtain a minimum distance value with a received signal in a demodulator for a digital communication system employing 8-ary PSK modulation.

It is another object of the present invention to provide an apparatus and method for calculating a soft decision value by a simple conditional formula in a digital communication system employing 8-ary PSK modulation.

To achieve the above and other objects, there is provided an 8-ary PSK demodulation apparatus for receiving an input signal $R_k(X_k, Y_k)$ comprised of a $k^{th}$ quadrature-phase component $Y_k$ and a $k^{th}$ in-phase component $X_k$, and for generating soft decision values $\Lambda(s_{k,0})$, $\Lambda(s_{k,1})$, and $\Lambda(s_{k,2})$ for the input signal $R_k(X_k, Y_k)$ by a soft decision means. The apparatus comprises a calculator for calculating a soft value $Z_k$ by subtracting a level $|Y_k|$ of the quadrature-phase signal component $Y_k$ from a level $|X_k|$ of the in-phase signal component $X_k$ of the received signal $R_k(X_k, Y_k)$, and outputting the $Z_k$ as a first soft decision value; a first selector for receiving the $Z_k$ from the calculator and an inverted value $-Z_k$ of the $Z_k$, and selecting the $Z_k$ or the $-Z_k$ according to a most significant bit (MSB) of the quadrature-phase signal component $Y_k$; a second selector for receiving the $Z_k$ from the calculator and the $-Z_k$, and selecting the $Z_k$ or the $-Z_k$ according to an MSB of the in-phase signal component $X_k$; a third selector for receiving an output of the second selector and a value "0", and selecting the output of the second selector or the value "0" according to an MSB of the function $Z_k$; a first adder for adding a value calculated by multiplying the quadrature-phase signal component $Y_k$ by $\sqrt{2}$ to an output of the third selector, and outputting the result value as a third soft decision value; a fourth selector for receiving an output of the second selector and a value "0", and selecting the output of the second selector or the value "0" according to the MSB of the function $Z_k$; and a second adder for adding a value calculated by multiplying the in-phase signal component $X_k$ by $\sqrt{2}$ to an output of the fourth selector, and outputting the result value as a second soft decision value To achieve the above and other objects, there is provided an 8-ary PSK demodulation method for receiving an input signal $R_k(X_k, Y_k)$ comprised of a $k^{th}$ quadrature-phase component $Y_k$ and a $k^{th}$ in-phase component $X_k$, and for generating soft decision values $\Lambda(s_{k,0})$, $\Lambda(s_{k,1})$, and $\Lambda(s_{k,2})$ for the input signal $R_k(X_k, Y_k)$ by a soft decision means. The method comprises the steps of: (a) calculating a soft value $Z_k$ of a first demodulated symbol by subtracting a level $|Y_k|$ of the quadrature-phase signal component $Y_k$ from a level $|X_k|$ of the in-phase signal component $X_k$ of the received signal $R_k(X_k, Y_k)$,(b) setting a first variable $\alpha$ to "0" if the soft value $Z_k$ has a positive value, setting the first variable $\alpha$ to "−1" if the $Z_k$ has a negative value and the quadrature-phase component $Y_k$ has a negative value and the quadrature-phase component $Y_k$ has a negative value; (c) determining a soft value of a third demodulated symbol by calculating $\sqrt{2}Y_k + \alpha^* Z_k$ using the quadrature-phase component $Y_k$, the soft value $Z_k$ and the first variable $\alpha$; (d) setting a second variable $\beta$ to "0" if the soft value $Z_k$ has a negative value, setting the second variable $\beta$ to "−1" if the $Z_k$ has a positive value and the in-phase component $X_k$ has a negative value, and setting the second variable $\beta$ to "1" if the $Z_k$ has a positive value and the in-phase component $X_k$ has a positive value; (e) determining a soft value of a second demodulated symbol by calculating $\sqrt{2}X_k + \beta^* Z_k$ using the in-phase component $X_k$, the soft value $Z_k$ and the second variable $\beta$.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

A preferred embodiment of the present invention will be described herein below with reference to the accompanying drawings. In the following description, well-known functions or constructions are not described in detail since they would obscure the invention in unnecessary detail.

The present invention provides a method for calculating multi-dimensional soft decision values needed as inputs to a channel decoder from a 2-dimentional received signal, using the dual minimum metric procedure.

In a transmitter, a modulator divides an output bit stream of a channel encoder into m-bit signal sequences, and maps the signal sequences to corresponding signal points among $M (=2^m)$ signal points according to a Gray coding rule. This can be represented by $$s_{k,m-1} s_{k,m-2} \cdots s_{k,0} \xrightarrow{f} I_k, Q_k \quad \text{Equation (1)}$$

Figure 1:
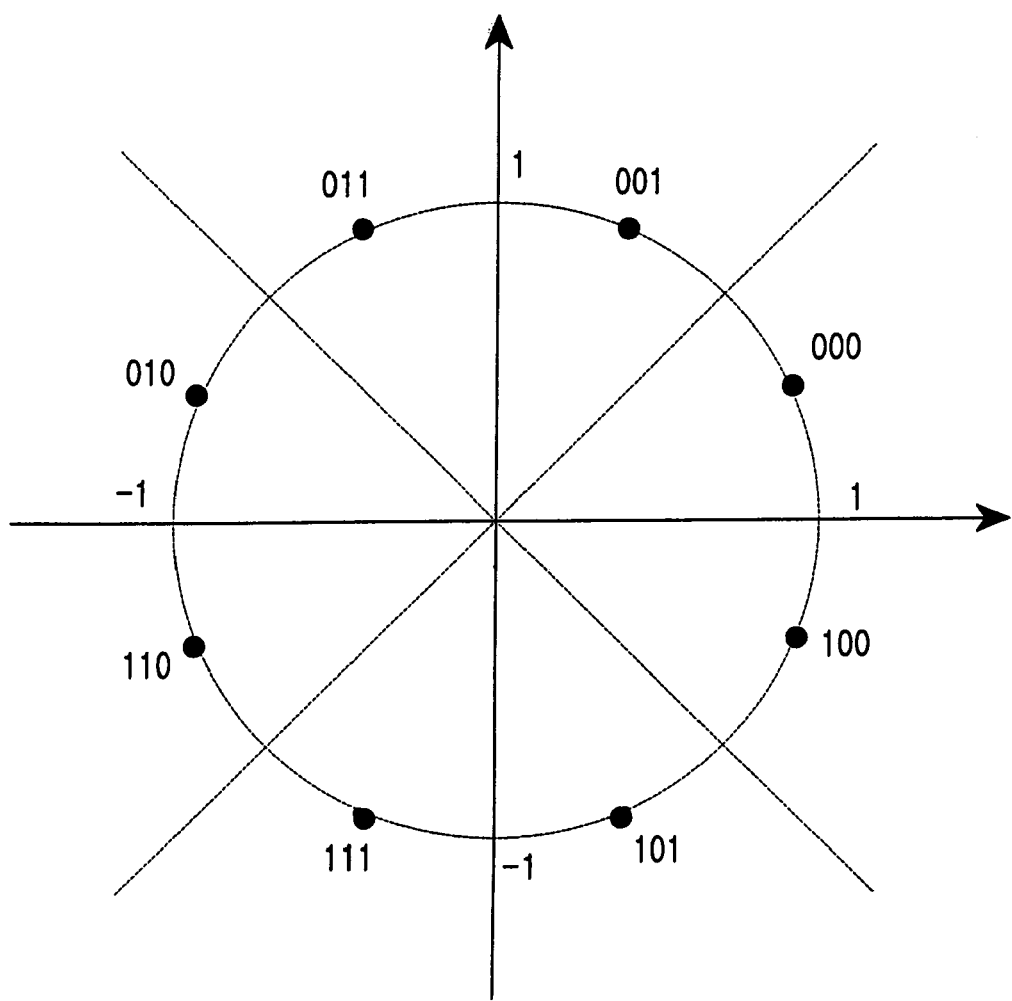
FIG. 1 illustrates a signal constellation with mapping points according to 8-ary PSK.

In Equation (1), $s_{k,1}$ (i=0,1, ..., m−1) indicates an $i^{th}$ bit in a signal sequence mapped to a $k^{th}$ symbol, and $I_k$ and $Q_k$ indicate an in-phase (I) signal component and a quadrature-phase (Q) signal component of the $k^{th}$ symbol, respectively. For 8-ary PSK, m=3 and a corresponding signal constellation are illustrated in FIG. 1. As illustrated, the signal constellation includes 8 $(=2^3)$ mapping points, each point having a 45° phase difference with the mapping points adjacent thereto.

As illustrated in FIG. 1, a symbol is mapped to an in-phase signal component $I_k$ and a quadrature-phase signal component $Q_k$, and transmitted to a receiver through transmission media. Upon receiving the in-phase signal component and the quadrature-phase signal component, the receiver demodulates the received signal components at a symbol demodulator. A received signal corresponding to the transmitted signal comprised of the in-phase signal component $I_k$ and the quadrature-phase signal component $Q_k$ can be expressed in a complex number by Equation (2) below, taking a transmission gain and noises into consideration.

Equation (2)

$$R_k \equiv X_k + jY_k = g_k(I_k + jQ_k) + (\eta_k^I + j\eta_k^Q)$$

In Equation (2), $X_k$ and $Y_k$ indicate an in-phase signal component and a quadrature-phase signal component of a 2-dimensional received signal mapped to a $k^{th}$ symbol, respectively. Further, $g_k$ is a complex coefficient indicating gains of the transmitter, the transmission media, and the receiver. In addition, $\eta_k^I$ and $\eta_k^Q$ are Gaussian noises with an average 0 and a divergence $\sigma_n^2$, and they are statistically independent of each other.

The symbol demodulator of the receiver calculates LLR using a received signal $R_k$ of Equation (2). The LLR corresponding to an $i^{th}$ bit $s_{k;1}$ (i=0,1, ..., m−1) in the output sequence of the channel encoder in the transmitter can be calculated by Equation (3), and the calculated LLR is provided to the channel decoder in the receiver as a soft decision value.

$$\Lambda(S_{ki}) = K\log Pr\frac{\{S_{ki} = 0 \mid X_k, Y_k\}}{Pr\{S_{ki} = 1 \mid X_k, Y_k\}} \quad \text{Equation (3)}$$

$$i = 0, 1, \ldots, m-1$$

In Equation (3), $\Lambda(s_{k,1})$ is an LLR or a soft decision value corresponding to $s_{k,1}$, k is a constant, and Pr{A|B} indicates a conditional probability defined as a probability that an event A will occur when an event B occurs. However, Equation (3) is non-linear, thus accompanying relatively many calculations. Therefore, it is necessary to approximate Equation (3), for actual realization. In the case of a Gaussian noise channel with $g_k=1$ in Equation (2), Equation (3) can be written as follows.

$$\Lambda(s_{k,i}) = K\log \frac{\sum_{z_k} \exp\{-1/\sigma_\eta^2 \mid R_k - z_k(s_{k,i} = 0)\mid^2\}}{\sum_{z_k} \exp\{-1/\sigma_\eta^2 \mid R_k - z_k(s_{k,i} = 1)\mid^2\}} \quad \text{Equation (4)}$$

However, Equation (4) is also non-linear. Therefore, Equation (4) can be approximated by the dual minimum metric procedure proposed by Motorola, as follows.

$$\Lambda(x_{k,i}) \approx K\log\exp\frac{\{-1/\sigma_\eta^2 \min\mid R_k - z_k(s_{k,i} = 0)\mid^2\}}{\exp\{-1/\sigma_\eta^2 \min\mid R_k - z_k(s_{k,i} = 1)\mid^2\}} \quad \text{Equation (5)}$$

$$= K'[\min\mid R_k - z_k(s_{k,i} = 1)\mid^2 -$$

$$\min\mid R_k - z_k(s_{k,i} = 0)\mid^2$$

In Equation (5), $K'=(1/\sigma_n^2)K$, and $z_k(s_{k,i}=0)$ and $z_k(s_{k,i}=1)$ indicate actual values of $I_k+jQ_k$ for $s_{k,1}=0$ and $s_{k,1}=1$, respectively. In order to calculate Equation (5), it is necessary to determine $z_k(s_{k,1}=0)$ and $z_k(s_{k,1}=1)$ for minimizing $|R^k-z_k(s_{k,1}=0)|^2$ and $|R_k-z_k(s_{k,i}=1)|^2$ for a 2-dimensional received signal $R_k$.

Taking into consideration $n_{k,i}$ indicating an $i^{th}$ bit value of a reverse mapping sequence for a signal point nearest to $R_k$ and $\bar{n}_{k,1}$ indicating a negation for $n_{k,1}$ Equation (5) approximated by the dual minimum metric procedure can be rewritten as $$\Lambda(s_{k,i}) = K'(2n_{k,i} - 1)[\mid R_k - z_k(s_{k,i} = n_{k,i})\mid^2 - \quad \text{Equation (6)}$$

$$\min\mid R_k - z_k(s_{k,i} = \bar{n}_{k,i})\mid^2]$$

That is, Equation (6) can be calculated by determining whether an $i^{th}$ bit value $n_{k,i}$ of a reverse mapping sequence for a signal point at the shortest distance from $R_k$ is "0" or "1" and determining the minimum $\bar{n}_{k,1}$ value for an $i^{th}$ bit value of the reverse mapping sequence. The value calculated by Equation (6) becomes a soft decision value for the $i^{th}$ bit value of the reverse mapping sequence. As the soft decision value becomes larger in a positive or a negative value, the information provided to a channel decoder becomes more correct.

The signal point at the shortest distance from $R_k$ is determined by ranges of an in-phase signal component value and a quadrature-phase signal component value of $R_k$. Therefore, a first term in the brackets of Equation (6) can be written as Equation (7)

$$|R_k - z_k(s_{k,1} = n_{k,i})|^2 = (X_k - U_k)^2 + (Y_k - V_k)^2$$

In Equation (7), $U_k$ and $V_k$ denote an in-phase signal component and a quadrature-phase signal component of a signal point mapped by $n_k = \{n_{k,m-1}, \ldots, n_{k,i}, \ldots, n_{k,1}, n_{k,0}\}$ respectively.

Further, a second term in the brackets of Equation (6) can be written as

Equation (8)

$$\min |R_k - z_k(s_{k,1} = \bar{n}_{k,1})|^2 = (X_k - U_{k,1})^2 + (Y_k - V_{k,1})^2$$

In Equation (8), $U_{k,1}$ and $V_{k,1}$ denote an in-phase signal component and a quadrature-phase signal component of a signal point mapped by a reverse mapping sequence $m_k = \{M_{k,m-l}, \ldots, m_{k,1} (=\bar{n}_{k,1}), \ldots, m_{k,1}, m_{k,0}\}$ of $Z_k$ minimizing $|R_k - z_k(s_{k,1} = \bar{n}_{k,1})|^2$, respectively. Equation (6) is rewritten as Equation (9) by Equation (7) and Equation (8).

$$\Lambda(s_{k,i}) = K'(2n_{k,i} - 1)[\{(X_k - U_k)^2 + (Y_k - V_k)^2\} - \{(X_k - U_{k,i})^2 + (Y_k - V_{k,i})^2\}] \quad \text{Equation (9)}$$
$$= K'(2n_{k,i} - 1)[(U_k + U_{k,i} - 2X_k)(U_k - U_{k,i}) + (V_k + V_{k,i} - 2Y_k)(V_k - V_{k,i})]$$

From Equation (9), m soft decision values needed as inputs to a channel decoder supporting m-level modulation can be calculated.

Herein, a process of calculating input soft decision values to the channel decoder by a demodulator in a data communication system employing 8-ary PSK by Equation (9) will be described.

First, Table 1 is used to calculate $\{n_{k,2}, n_{k,1}, n_{k,0}\}$, $U_k$ and $V_k$ from two signal components $X_k$ and $Y_k$ of an 8-ary PSK-modulated received signal $R_k$. Table 1 illustrates $\{(n_{k,2}, n_{k,1}, n_{k,0}), U_k$ and $V_k$ for the case where a received signal $R_k$ appears in each of 8 regions centered on the signal points in FIG. 1. For the sake of convenience, 4 boundary values, i.e., result values at $X_k=0$, $Y_k=0$, $Y_k=X_k$, $Y_k=-X_k$ are omitted from Table 1.

TABLE 1

| Condition of Yk | Condition of $Y_k/X_k$ | $\{n_{k,2}, n_{k,1}, n_{k,0}\}$ | $U_k$ | $V_k$ |
|---|---|---|---|---|
| $Y_k > 0$ | $Y_k/X_k > 1$ | {0, 0, 1} | $\sin(\pi/8)$ | $\cos(\pi/8)$ |
| | $0 < Y_k/X_k < 1$ | {0, 0, 0} | $\cos(\pi/8)$ | $\sin(\pi/8)$ |
| | $-1 < Y_k/X_k < 0$ | {0, 1, 0} | $-\cos(\pi/8)$ | $\sin(\pi/8)$ |
| | $Y_k/X_k < -1$ | {0, 1, 1} | $-\sin(\pi/8)$ | $\cos(\pi/8)$ |
| $Y_k < 0$ | $Y_k/X_k > 1$ | {1, 1, 1} | $-\sin(\pi/8)$ | $-\cos(\pi/8)$ |
| | $0 < Y_k/X_k < 1$ | {1, 1, 0} | $-\cos(\pi/8)$ | $-\sin(\pi/8)$ |
| | $-1 < Y_k/X_k < 0$ | {1, 0, 0} | $\cos(\pi/8)$ | $-\sin(\pi/8)$ |
| | $Y_k/X_k < -1$ | {1, 0, 1} | $\sin(\pi/8)$ | $-\cos(\pi/8)$ |

Further, Table 2 illustrates a sequence $\{m_{k,2}, m_{k,1}, m_{k,0}\}$ minimizing $|R_k - z_k(s_{k,1} = \bar{n}_{k,i})|^2$ calculated for i (where $i \in \{0, 1, 2\}$), in terms of a function of $\{n_{k,2}, n_{k,1}, n_{k,0}\}$, and also illustrates in-phase and quadrature-phase signal components $U_{k,1}$ and $V_{k,1}$ of the corresponding $z_k$.

TABLE 2

| i | $\{m_{k,2}, m_{k,1}, m_{k,0}\}$ | $U_{k,i}$ | $V_{k,i}$ |
|---|---|---|---|
| 2 | $\{\bar{n}_{k,2}, n_{k,1}, 0\}$ | $U_{k,2}$ | $V_{k,2}$ |
| 1 | $\{n_{k,2}, \bar{n}_{k,1}, 1\}$ | $U_{k,1}$ | $V_{k,1}$ |
| 0 | $\{n_{k,2}, n_{k,1}, \bar{n}_{k,0}\}$ | $U_{k,0}$ | $V_{k,0}$ |

Table 3 illustrates $V_{k,1}$ and $U_{k,1}$ corresponding to $\{m_{k,2}, m_{k,1}, m_{k,0}\}$ determined from Table 2, for all combinations of $\{n_{k,2}, n_{k,1}, n_{k,0}\}$.

TABLE 3

| $\{n_{k,2}, n_{k,1}, n_{k,0}\}$ | $U_{k,2}$ | $U_{k,1}$ | $U_{k,0}$ | $V_{k,2}$ | $V_{k,1}$ | $V_{k,0}$ |
|---|---|---|---|---|---|---|
| {0, 0, 1} | $\cos(\pi/8)$ | $-\sin(\pi/8)$ | $\cos(\pi/8)$ | $-\sin(\pi/8)$ | $\cos(\pi/8)$ | $\sin(\pi/8)$ |
| {0, 0, 0} | $\cos(\pi/8)$ | $-\sin(\pi/8)$ | $\sin(\pi/8)$ | $-\sin(\pi/8)$ | $\cos(\pi/8)$ | $\cos(\pi/8)$ |
| {0, 1, 0} | $-\cos(\pi/8)$ | $\sin(\pi/8)$ | $-\sin(\pi/8)$ | $-\sin(\pi/8)$ | $\cos(\pi/8)$ | $\cos(\pi/8)$ |
| {0, 1, 1} | $-\cos(\pi/8)$ | $\sin(\pi/8)$ | $-\cos(\pi/8)$ | $-\sin(\pi/8)$ | $\cos(\pi/8)$ | $\sin(\pi/8)$ |
| {1, 1, 1} | $-\cos(\pi/8)$ | $\sin(\pi/8)$ | $-\cos(\pi/8)$ | $\sin(\pi/8)$ | $-\cos(\pi/8)$ | $-\sin(\pi/8)$ |
| {1, 1, 0} | $-\cos(\pi/8)$ | $\sin(\pi/8)$ | $-\sin(\pi/8)$ | $\sin(\pi/8)$ | $-\cos(\pi/8)$ | $-\cos(\pi/8)$ |
| {1, 0, 0} | $\cos(\pi/8)$ | $-\sin(\pi/8)$ | $\sin(\pi/8)$ | $\sin(\pi/8)$ | $-\cos(\pi/8)$ | $-\cos(\pi/8)$ |
| {1, 0, 1} | $\cos(\pi/8)$ | $-\sin(\pi/8)$ | $\cos(\pi/8)$ | $\sin(\pi/8)$ | $-\cos(\pi/8)$ | $-\sin(\pi/8)$ |

Table 4 illustrates results given by down-scaling, in a ratio of $K'(\sqrt{(2+\sqrt{2})} - \sqrt{(2-\sqrt{2})})$, soft decision values obtained by substituting $V_{k,1}$ and $U_{k,i}$ of Table 3 into Equation (9), i.e., illustrates the results normalized by $K'(\sqrt{(2+\sqrt{2})} - \sqrt{(2-\sqrt{2})})$. That is, when a received signal $R_k$ is applied, an LLR satisfying a corresponding condition can be determined as a soft decision value by Table 4. If the channel decoder used in the system is not a max-logMAP (logarithmic maximum a posteriori) decoder, a process of up-scaling the LLR of Table 4 in a reverse ratio of the down-scale ratio must be added.

TABLE 4

| Condition of $Y_k$ | Condition of $Y_k/X_k$ | $\Lambda(s_{k,2})$ | $\Lambda(s_{k,1})$ | $\Lambda(s_{k,0})$ |
|---|---|---|---|---|
| $Y_k > 0$ | $Y_k/X_k > 1$ | $\sqrt{2}Y_k + (-X_k + Y_k)$ | $\sqrt{2}X_k$ | $X_k - Y_k$ |
| | $0 < Y_k/X_k < 1$ | $\sqrt{2}Y_k$ | $\sqrt{2}X_k + (X_k - Y_k)$ | $X_k - Y_k$ |
| | $-1 < Y_k/X_k < 0$ | $\sqrt{2}Y_k$ | $\sqrt{2}X_k + (X_k + Y_k)$ | $-X_k - Y_k$ |
| | $Y_k/X_k < -1$ | $\sqrt{2}Y_k + (X_k + Y_k)$ | $\sqrt{2}X_k$ | $-X_k - Y_k$ |
| $Y_k < 0$ | $Y_k/X_k > 1$ | $\sqrt{2}Y_k + (-X_k + Y_k)$ | $\sqrt{2}X_k$ | $-X_k + Y_k$ |
| | $0 < Y_k/X_k < 1$ | $\sqrt{2}Y_k$ | $\sqrt{2}X_k + (X_k - Y_k)$ | $-X_k + Y_k$ |
| | $-1 < Y_k/X_k < 0$ | $\sqrt{2}Y_k$ | $\sqrt{2}X_k + (X_k + Y_k)$ | $X_k + Y_k$ |
| | $Y_k/X_k < -1$ | $\sqrt{2}Y_k + (X_k + Y_k)$ | $\sqrt{2}X_k$ | $X_k + Y_k$ |

However, when performing 8-ary PSK soft decision demodulation using Table 4, the demodulator should first perform a condition determining operation, including a dividing operation, on the two components of a received signal. Thereafter, the demodulator selects a formula corresponding to the result of the condition determining operation among the formulas designated according to the conditions, and substitutes the two components of the received signal into the selected formula, thereby calculating soft decision values. To this end, the demodulator requires an operator for performing the dividing operation and a memory for storing different formulas according to the condition.

In order to exclude the dividing operation and remove the memory, it is necessary to modify condition determining formulas and derive soft decision value calculation formulas that can be commonly applied even to the different conditions. To this end, the condition determining formulas shown in Table 4 can be expressed as shown in Table 5, using a new function $Z_k$ defined as $|X_k|-|Y_k|$. In Table 5, the dividing operations are excluded and the soft decision values at the 4 boundary values, which were omitted from Table 4 for convenience, are taken into consideration.

TABLE 5

| Condition of $Y_k$ | Condition of $X_k$ | Condition of $Z_k$ | $\Lambda(s_{k,2})$ | $\Lambda(s_{k,1})$ | $\Lambda(s_{k,0})$ |
|---|---|---|---|---|---|
| $Y_k \geq 0$ | $X_k \geq 0$ | $Z_k \geq 0$ | $\sqrt{2}Y_k$ | $\sqrt{2}X_k + (X_k - Y_k)$ | $X_k - Y_k$ |
|  |  | $Z_k < 0$ | $\sqrt{2}Y_k - (X_k - Y_k)$ | $\sqrt{2}X_k$ | $X_k - Y_k$ |
|  | $X_k < 0$ | $Z_k \geq 0$ | $\sqrt{2}Y_k$ | $\sqrt{2}X_k - (-X_k - Y_k)$ | $-X_k - Y_k$ |
|  |  | $Z_k < 0$ | $\sqrt{2}Y_k - (-X_k - Y_k)$ | $\sqrt{2}X_k$ | $-X_k - Y_k$ |
| $Y_k < 0$ | $X_k \geq 0$ | $Z_k \geq 0$ | $\sqrt{2}Y_k$ | $\sqrt{2}X_k + (X_k + Y_k)$ | $X_k + Y_k$ |
|  |  | $Z_k < 0$ | $\sqrt{2}Y_k + (X_k + Y_k)$ | $\sqrt{2}X_k$ | $X_k + Y_k$ |
|  | $X_k < 0$ | $Z_k \geq 0$ | $\sqrt{2}Y_k$ | $\sqrt{2}X_k - (-X_k + Y_k)$ | $-X_k + Y_k$ |
|  |  | $Z_k < 0$ | $\sqrt{2}Y_k + (-X_k + Y_k)$ | $\sqrt{2}X_k$ | $-X_k + Y_k$ |

In hardware realization, Table 5 can be simplified into Table 6 on condition that a sign of $X_k$, $Y_k$, and $Z_k$ can be expressed by their MSB (Most Significant Bit), or sign bit. In Table 6, MSB(x) denotes an MSB of a given value x.

TABLE 6

| $MSB(Y_k)$ | $MSB(X_k)$ | $MSB(Z_k)$ | $\Lambda(s_{k,2})$ | $\Lambda(s_{k,1})$ | $\Lambda(s_{k,0})$ |
|---|---|---|---|---|---|
| 0 | 0 | 0 | $\sqrt{2}Y_k$ | $\sqrt{2}X_k + Z_k$ | $Z_k$ |
|  |  | 1 | $\sqrt{2}Y_k - Z_k$ | $\sqrt{2}X_k$ |  |
|  | 1 | 0 | $\sqrt{2}Y_k$ | $\sqrt{2}X_k - Z_k$ |  |
|  |  | 1 | $\sqrt{2}Y_k - Z_k$ | $\sqrt{2}X_k$ |  |
| 1 | 0 | 0 | $\sqrt{2}Y_k$ | $\sqrt{2}X_k + Z_k$ |  |
|  |  | 1 | $\sqrt{2}Y_k + Z_k$ | $\sqrt{2}X_k$ |  |
|  | 1 | 0 | $\sqrt{2}Y_k$ | $\sqrt{2}X_k - Z_k$ |  |
|  |  | 1 | $\sqrt{2}Y_k + Z_k$ | $\sqrt{2}X_k$ |  |

From Table 6, soft decision values $\Lambda(s_{k,2})$, $\Lambda(s_{k,1})$, and $\Lambda(s_{k,0})$ for each i are expressed as $$\Lambda(s_{k,2}) = \sqrt{2}\,Y_k + \alpha \cdot Z_k, \text{ where} \qquad \text{Equation (10)}$$

$$\alpha = \begin{cases} 0 & \text{if } MSB(Z_k) = 0 \\ -1 & \text{if } MSB(Z_k) = 1 \text{ and } MSB(Y_k) = 0 \\ 1 & \text{if } MSB(Z_k) = 1 \text{ and } MSB(Y_k) = 1 \end{cases}$$

In Equation (10), a parameter α is 0 for $MSB(Z_k)=0$, −1 for $MSB(Z_k)=1$ and $MSB(Y_k)=0$, and 1 for $MSB(Z_k)=1$ and $MSB(Y_k)=1$.

$$\Lambda(s_{k,1}) = \sqrt{2}\,X_k + \beta \cdot Z_k, \text{ where} \qquad \text{Equation (11)}$$

$$\beta = \begin{cases} 0 & \text{if } MSB(Z_k) = 1 \\ -1 & \text{if } MSB(Z_k) = 0 \text{ and } MSB(X_k) = 1 \\ 1 & \text{if } MSB(Z_k) = 0 \text{ and } MSB(X_k) = 0 \end{cases}$$

In Equation (11), a parameter β is 0 for $MSB(Z_k)=1$, −1 for $MSB(Z_k)=0$ and $MSB(X_k)=1$, and 1 for $MSB(Z_k)=0$ and $MSB(X_k)=0$.

$$\Lambda(S_{k,0}) = Z_k \qquad \text{Equation (12)}$$

That is, in the digital communication system employing 8-ary PSK, it is possible to actually calculate 3 soft decision values, which are outputs of the demodulator for one received signal or inputs to the channel decoder, using the dual minimum metric procedure of Equation (4), through the simple conditional formulas of Equation (10) to Equation (12). This process is illustrated in FIG. 2.

Figure 2:
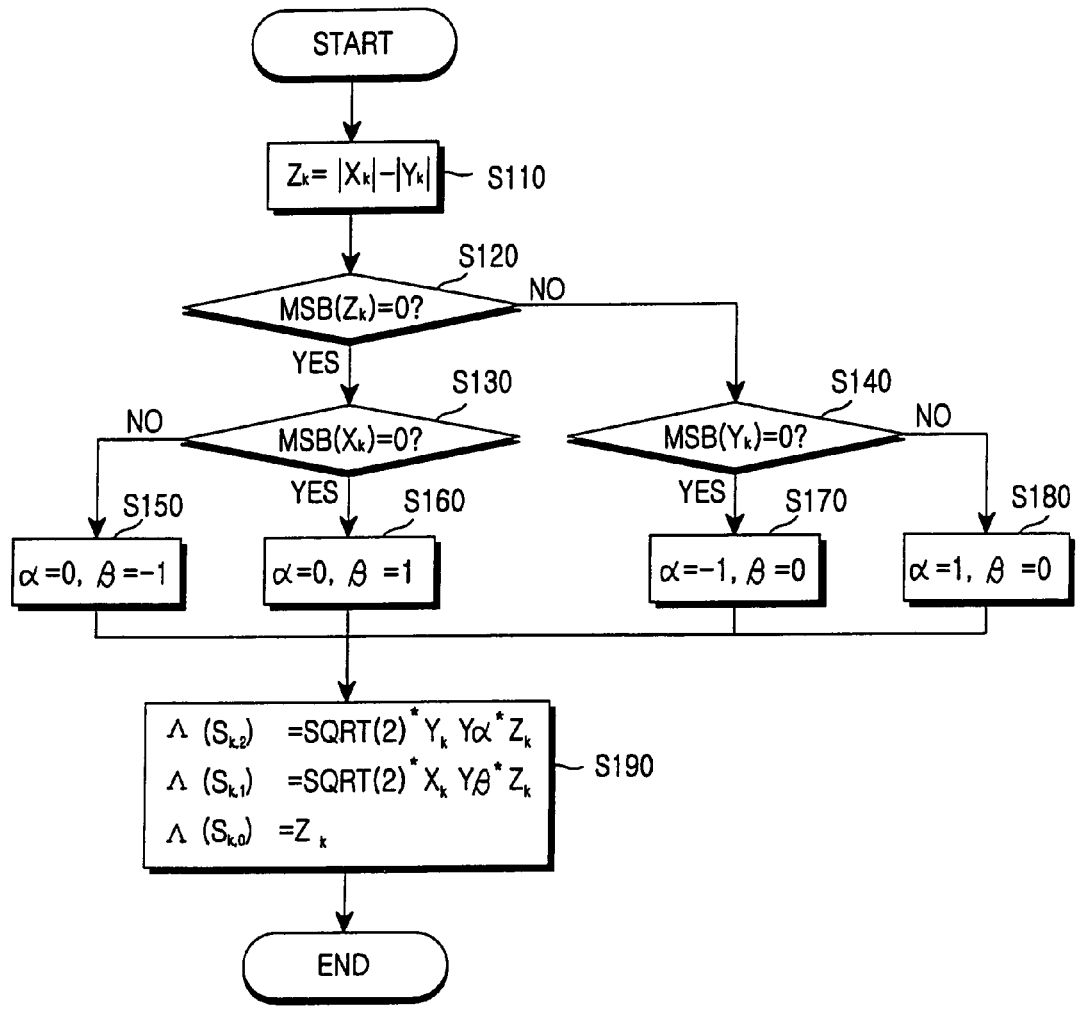
FIG. 2 illustrates a procedure for calculating soft decision values in a digital communication system employing 8-ary PSK according to an embodiment of the present invention.

FIG. 2 illustrates a procedure for calculating soft decision values in a digital communication system employing 8-ary PSK according to an embodiment of the present invention. Referring to FIG. 2, in step S110, a symbol demodulator calculates $|Z_k|=|X_k|-|Y_k|$ to define the condition determining formulas shown in Table 4 as a new function. The symbol demodulator analyzes an MSB of the $Z_k$ in step S120, in order to determine α and β according to the MSB of the $Z_k$ in Equation (1) to Equation (12). As a result of the analysis in step S120, if the MSB of the $Z_k$ is "0", the symbol demodulator proceeds to step S130, and otherwise, proceeds to step S140. In step S130, the symbol demodulator analyzes an MSB of $X_k$. As a result of the analysis in step S130, if the MSB of the $X_k$ is "1", the symbol demodulator sets the parameter α to "0" and the parameter β to "−1" in step S150. If the MSB of the $X_k$ is "0", the symbol demodulator sets the parameter α to "0" and the parameter β to "1" in step S160.

As a result of the analysis in step S120, if the MSB of the $Z_k$ is "1", the symbol demodulator analyzes an MSB of $Y_k$ in step S140. As a result of the analysis in step S140, if the MSB of the $Y_k$ is "0", the symbol demodulator sets the parameter α to "−1" and the parameter β to "0" in step S170. If the MSB of the $Y_k$ is "1", the symbol demodulator sets the parameter α to "1" and the parameter β to "0" in step S180. Thereafter, in step S190, the symbol demodulator calculates soft decision values by substituting the parameters α and β determined in the proceeding steps and the received signal into Equation (10) to Equation (12). In this way, the symbol demodulation is performed.

Summarizing, the process of calculating soft decision values by the dual minimum metric procedure includes a first step of determining the first parameter α and the second parameter β by analyzing a 2-dimensional received signal comprised of an in-phase signal component and a quadrature-phase calculating soft decision values using the 2-dimensional received signal and the first parameter α and the second parameter β determined in the first step. The determined soft decision values of a demodulated symbol are provided to a channel decoder.

Figure 3:
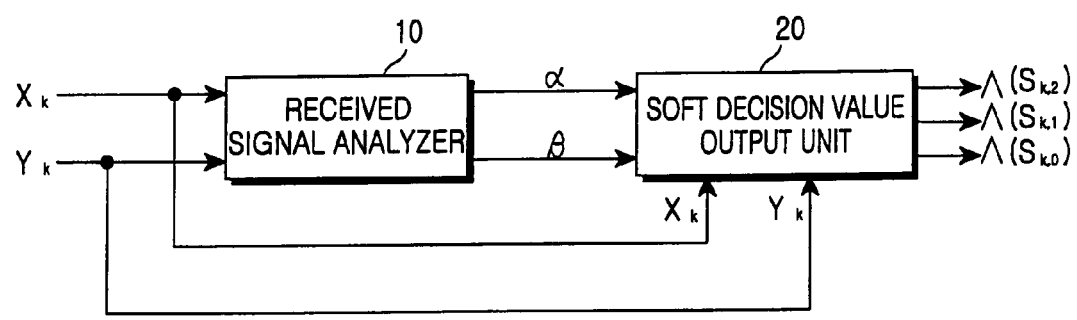
FIG. 3 illustrates block diagram of a calculator for determining soft decision values of a demodulated symbol according to an embodiment of the present invention.

FIG. 3 illustrates a calculator for determining soft decision values of a demodulated symbol according to an embodiment of the present invention. Referring to FIG. 3, the calculator for determining soft decision values by the dual minimum metric procedure in a digital communication system includes a received signal analyzer 10 and a soft decision value output unit 20. The received signal analyzer 10 determines first and second parameters α and β by analyzing a received signal comprised of an in-phase signal component $X_k$ and a quadrature-phase signal component $Y_k$. The soft decision value output unit 20 then calculates soft decision values $\Lambda(s_{k,2})$, $\Lambda(s_{k,1})$, and $\Lambda(s_{k,0})$ required for soft decision decoding, using the received signal and the determined parameters α and β.

Figure 4:
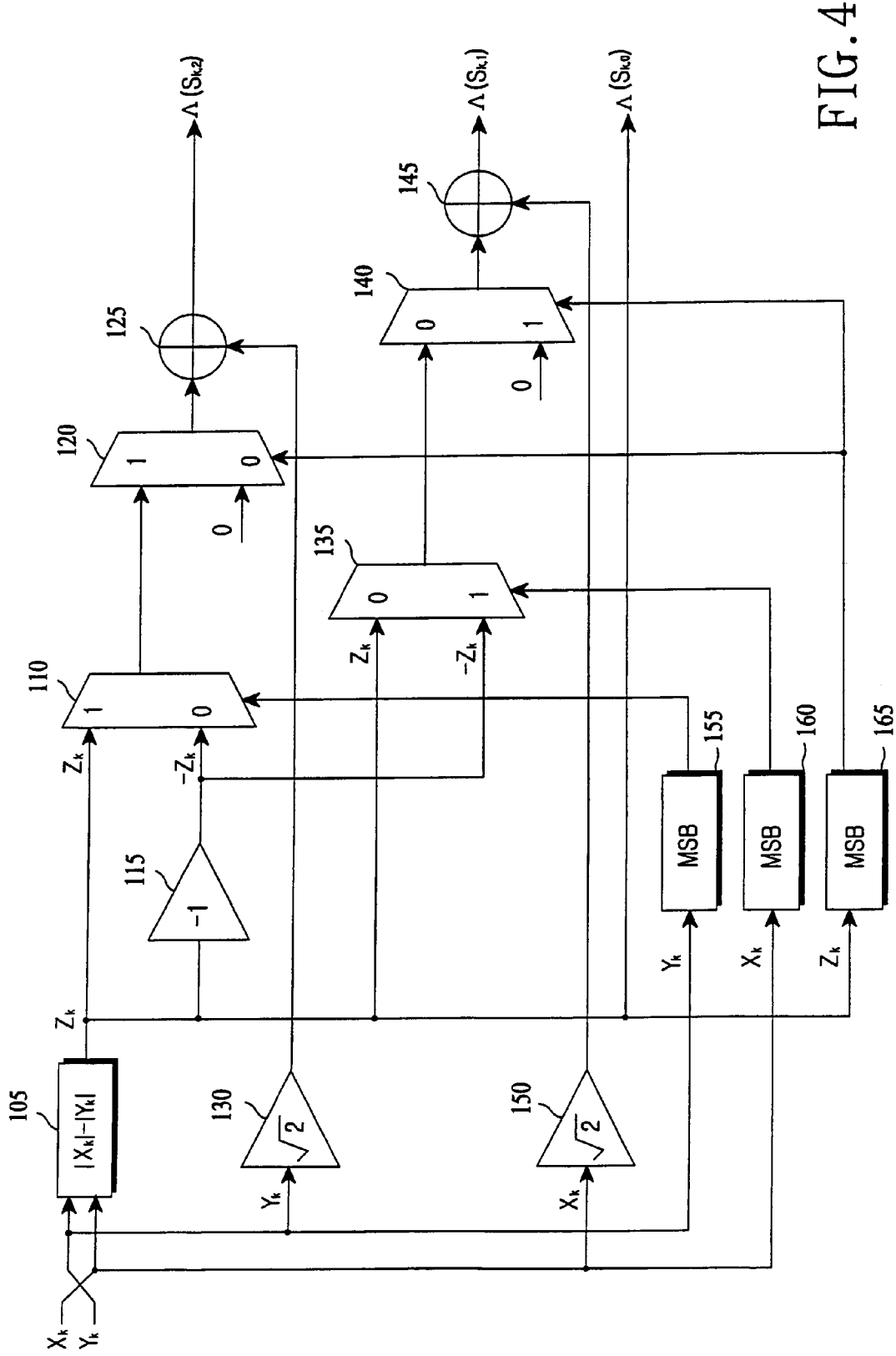
FIG. 4 illustrates a logic circuit of a soft decision value calculator for use in a digital communication system employing 8-ary PSK.

A logic circuit of the calculator for calculating soft decision values in accordance with Equation (10) to Equation (12) is illustrated in FIG. 4. In particular, FIG. 4 illustrates a soft decision value calculator for use in a digital communication system employing 8-ary PSK. The logic circuit of FIG. 4 is included in a demodulator of the digital communication system employing 8-ary PSK, and calculates soft decision values using Equation (10) to Equation (12). Herein, the 2-dimensional received signal $R_k$, in-phase signal component $X_k$, quadrature-phase signal component $Y_k$, variable $Z_k$, parameter α, and parameter β are all real numbers, and digital values with a sign bit. In FIG. 4, a calculator 105, an inverter 115, a first MSB extractor 155, a first selector 110, a third MSB extractor 165 and a third selector 120 constitute a structure for determining the first parameter α. Further, the calculator 105, the inverter 115, a second MSB extractor 160, a second selector 135, the third MSB extractor 165 and a fourth selector 140 constitutes a structure for determining the second parameter β.

Referring to FIG. 4, the calculator 105 calculates $Z_k=|X_k|-|Y_k|$ using an in-phase signal component $X_k$ and a quadrature-phase signal component $Y_k$ of a 2-dimensional received signal $R_k$ mapped to a $k^{th}$ symbol. The inverter 115 inverts a sign of the $Z_k$ by calculating the $Z_k$ from the calculator 105 by "−1. The first MSB extractor 155 extracts an MSB of the $Y_k$ received, and provides the extracted MSB to the first selector 110 as a first select signal. The second MSB extractor 160 extracts an MSB of the $X_k$ received, and provides the extracted MSB to the second selector 135 as a second select signal. The third MSB extractor 165 extracts an MSB of the $Z_k$ received from the calculator 105, and provides the extracted MSB to the third selector 120 as a third select signal. In addition, the $Y_k$ is multiplied by $\sqrt{2}$ at a first multiplier 130, and the $X_k$ is also multiplied by $\sqrt{2}$ at a second multiplier 150.

The first selector 110 receives the $Z_k$ from the calculator 105 and the "$-Z_k$" from the inverter 115, and selects one of the inputs according to the first select signal from the first MSB extractor 155. The third selector 120 then receives an output of the first selector 110 and a bit "0", and selects one of the inputs according to the third select signal from the third MSB extractor 165. An output of the third selector 120 is added to an output value $\sqrt{2}Y_k$ of the first multiplier 130 by a first adder 125, generating a third soft decision value $\Lambda(s_{k,2})$ of the received signal $R_k$ mapped to a $k^{th}$ symbol.

In addition, the second selector 135 receives the $Z_k$ from the calculator 105 and the "$-Z_k$" from the inverter 115, and selects one of the inputs according to the second select signal from the second MSB extractor 160. The fourth selector 140 then receives an output of the second selector 135 and a bit "0", and selects one of the inputs according to the third select signal from the third MSB extractor 165. An output of the fourth selector 140 is added to an output value $\sqrt{2}X_k$ of the second multiplier 150 by a second adder 145, thus generating a second soft decision value $\Lambda(s_{k,1})$ of the received signal $R_k$ mapped to the $k^{th}$ symbol.

Meanwhile, the $Z_k$ output from the calculator 105 becomes a first soft decision value $\Lambda(s_{k,0})$ of the received signal $R_k$ mapped to the $k^{th}$ symbol.

According to the foregoing description, a conventional soft decision value calculator using the dual minimum metric procedure realized by Equation (5) needs ten or more squaring operations, and comparison operations. However, the novel calculator of FIG. 4 realized using Equation (10) to Equation (12) is comprised of 3 adders, 3 multipliers, and 4 multiplexers, contributing to a remarkable reduction in operation time and complexity of the calculator. Table 7 below illustrates a comparison made between Equation (5) and Equations (10) to (12) in terms of the type and number of operations, for $i \in \{0, 1, 2\}$.

TABLE 7

| Equation (4) | | Equations (10) to (12) | |
|---|---|---|---|
| Operation | No of Operations | Operation | No of Operations |
| Addition | 3 × 8 + 3 = 27 | Addition | 3 |
| Squaring | 2 × 8 = 16 | Multiplication | 3 |
| Comparison | 3 × 2 × 3 = 18 | Multiplexing | 4 |

In sum, the present invention derives Table 6 to Table 11 from Equation (6) to Equation (8) and the process of Table 1 to Table 5, in order to reduce a time delay and complexity, which may occur when Equation (4), the known dual minimum metric procedure, or Equation (5), obtained by simplifying the dual minimum metric procedure, is actually realized using the 16-ary QAM. Further, the present invention provides Equation (9) and Equation (10), new formulas used to realize the dual minimum metric-procedure in the 16-ary QAM. In addition device realized based on Equation (9) and Equation (10).

Figure 5:
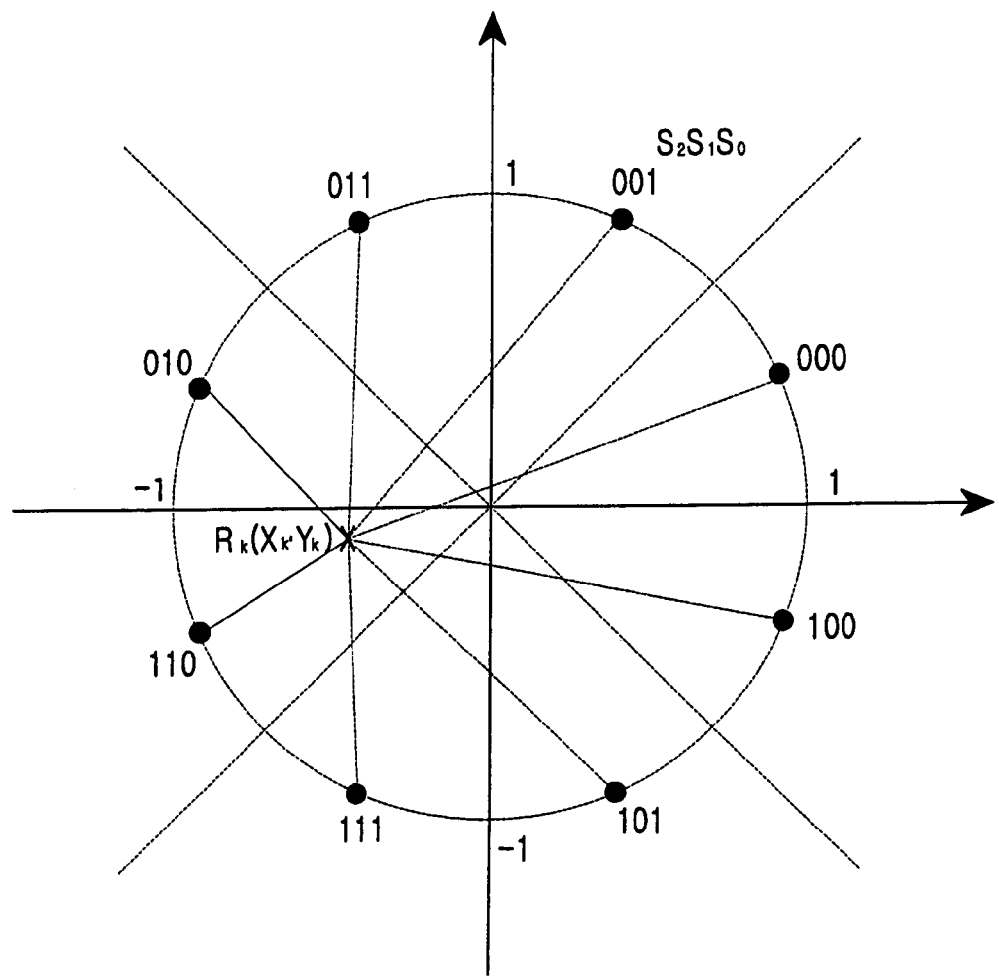
FIG. 5 illustrates a signal constellation having mapping points according to the 8-ary PSK, for explanation of calculations.

Now, a comparison will be made between a conventional method of calculating a soft decision value $\Lambda(s_{k,2})$ using Equation (5) and a new method of calculating the soft decision value $\Lambda(s_{k,2})$ using Equation (10). FIG. 5 illustrates a signal constellation having mapping points according to the 8-ary PSK, for explanation of calculations. Referring to FIG. 5, a 2-dimensional received signal $R_k$ comprised of an in-phase signal component $X_k$ and a quadrature-phase signal component $Y_k$ has a coordinate value represented by "x." Herein, it will be assumed that $X_k=-0.6$ and $Y_k=-0.1$.

First, a conventional process of calculating a soft decision value $\Lambda(s_{k,2})$ using Equation (5) will be described.

The square of each distance between a received signal $R_k$ and 4 mapping points with $s_{k,2}=1$ (i.e., 4 mapping points under an x-axis in FIG. 5) is first calculated to determine the shortest distance.

The square of a distance from a mapping point "110"={−0.6−cos(9π/8)}²+{−0.1−sin(9π/8)}²=0.185

The square of a distance from a mapping point "111"={−0.6−cos(11π/8)}²+{−0.1−sin(11π/8)}²=0.726

The square of a distance from a mapping point "101"={−0.6−cos(13π/8)}²+{−0.1−sin(13π/8)}²=1.644

The square of a distance from a mapping point "100"={−0.6−cos(15π/8)}²+{−0.1−sin(15π/8)}²=2.402

Therefore, the minimum value (or the shortest distance from the received signal $R_k$) $|R_k-z_k(s_{k,2}=1)|^2$ is 0.185.

Then, the square of each distance between the received signal $R_k$ and 4 mapping points with $s_{k,2}=0$ (i.e., 4 mapping points over the x-axis in FIG. 5) is calculated to determine the shortest distance.

The square of a distance from a mapping point "000"={−0.6−cos(π/8)}²+{−0.1−sin(π/8)}²2.555

The square of a distance from a mapping point "001"={−0.6−cos(3π/8)}²+{−0.1−sin(3π/8)}²=2.014

The square of a distance from a mapping point "011"={−0.6−cos(5π/8)}²+{−0.1−sin(5π/8)}²=1.096

The square of a distance from a mapping point "010"={−0.6−cos(7π/8)}²+{−0.1−sin(7π/8)}²=0.338

Therefore, the minimum distance of $|R_k-z_k(s_{k,2}=1)|^2$ is 0.338.

If the above results are substituted into Equation (5), then the soft decision value becomes $$\Lambda(s_{k,2}) = K'[\min|R_k - z_k(s_{k,2} = 1)|^2 - \min|R_k - z_k(s_{k,2} = 0)|^2]$$

$$= K' \times (0.185 - 9.338)$$

$$= -0.153 \times K'$$

Next, a new process of calculating a soft decision value $\Lambda(s_{k,2})$ using Equation (10) will be described.

$Z_k$ and $\alpha$ are first calculated.

$$Z_k=|X_k|-|Y_k|=|-0.6|-|-0.1|=0.5$$

From this, since $Z_k \geq 0$, i.e., $MSB(Z_k)=0$, $\alpha=0$.

If the above results are substituted into Equation (10), then the soft decision value becomes $$\Lambda(s_{k,2})=\sqrt{2}Y_k+\alpha\cdot Z_k=\sqrt{2}\times(-0.1)+0\times 0.5=-0.141$$

Here, the reason that the result of Equation (5) is different from the result of Equation (10) is because a soft decision value calculated by Equation (9) was normalized by $K'(\sqrt{(2+\sqrt{2})}-\sqrt{(2-\sqrt{2})})$. In the case of a turbo decoder using a max-logMAP core (currently, both L3QS and 1×TREME use max-logMAP core), normalizing all LLR values (or soft values) using the same coefficient never affects performance.

If a coefficient is actually multiplied to calculate a non-normalized value, then $$-0.141 \times K' \sqrt{(2+\sqrt{2})}-\sqrt{(2-\sqrt{2})})=-0.141\times 1.082 \times K'=-0.153\times K'$$

It is noted that the calculated non-normalized value is identical to the result of Equation (5).

Summarizing, in order to reduce a time delay and complexity caused by the use of the dual minimum metric procedure of Equation (5), the present invention draws the mapping tables of Table 4 to Table 6 through the process of Equation (6) to Equation (9) and Table 1 to Table 3. Further, the present invention substitutes the mapping tables into Equation (10) to Equation (12), the dual minimum metric procedure realizing formulas. In addition, the present invention provides a logic circuit of a calculator for calculating 8-ary PSK soft decision values, realized by E As described above, in deriving a soft decision value needed as an input to a channel decoder by the dual minimum metric procedure, the novel demodulator for a digital communication system employing 8-ary PSK modulation enables simple and rapid calculations, contributing to a remarkable reduction in an operation time and complexity of the demodulator that calculates soft decision values.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. An 8-ary PSK (Phase Shift Keying) demodulation apparatus for receiving an input signal $R_k(X_k, Y_k)$ comprised of a $k^{th}$ quadrature-phase component $Y_k$ and a $k^{th}$ in-phase component $X_k$, and for generating soft decision values $\Lambda(S_{k,0})$, $\Lambda(S_{k,1})$, and $\Lambda(S_{k,2})$ for the input signal $R_k(X_k, Y_k)$ by a soft decision means, comprising:

a received signal analyzer for calculating a function $Z_k$ of the input signal $R_k(X_k, Y_k)$ according to an equation $Z_k=|X_k|-|Y_k|$, and determining a first parameter $\alpha$ and a second parameter $\beta$ by the input signal; and a soft decision value output unit for calculating the soft decision values for the input signal $R_k(X_k, Y_k)$, using the first parameter $\alpha$, the second parameter $\beta$, and the received signal $R_k(X_k, Y_k)$, according to $$\Lambda(s_{k,2}) = \sqrt{2}Y_k + \alpha\cdot Z_k, \text{ where } \alpha = \begin{cases} 0 & \text{if } Z_k \geq 0 \\ -1 & \text{if } Z_k < 0 \text{ and } Y_k \geq 0 \\ 1 & \text{if } Z_k < 0 \text{ and } Y_k < 0 \end{cases}$$

$$\Lambda(s_{k,1}) = \sqrt{2}X_k + \beta\cdot Z_k, \text{ where } \beta = \begin{cases} 0 & \text{if } Z_k < 0 \\ -1 & \text{if } Z_k \geq 0 \text{ and } X_k < 0 \\ 1 & \text{if } Z_k \geq 0 \text{ and } X_k \geq 0 \end{cases}$$

$\Lambda(S_{k,0})=Z_k$ where $\Lambda(S_{k,i})$ indicates a soft decision value corresponding to $S_{k,i}$ (i=0,1,2), and $S_{k,i}$ indicates an $i^{th}$ bit in a coded signal sequence mapped to a $k^{th}$ symbol.

2. An 8-ary PSK (Phase Shift Keying) demodulation method for receiving an input signal $R_k(X_k, Y_k)$ comprised of a $k^{th}$ quadrature-phase component $Y_k$ and a $k^{th}$ in-phase component $X_k$, and for generating soft decision values $\Lambda(S_{k,0})$, $\Lambda)S_{k,1}$), and $\Lambda(S_{k,2})$ for the input signal $R_k(X_k, Y_k)$ by a soft decision means, comprising the steps of:

calculating a soft value $Z_k$ of the input signal $R_k(X_k, Y_k)$ according to equation $Z_k = |X_k|-|Y_k|$, and determining a first parameter $\alpha$ and a second parameter $\beta$ by the input signal; and calculating the soft decision values for the input signal $R_k(X_k, Y_k)$, using the first parameter $\alpha$, the second parameter $\beta$, and the received signal $R_k(X_k, Y_k)$, according to $$\Lambda(s_{k,2}) = \sqrt{2}Y_k + \alpha\cdot Z_k,$$

$$\text{where } \alpha = \begin{cases} 0 & \text{if } MSB(Z_k) = 0 \\ -1 & \text{if } MSB(Z_k) = 1 \text{ and } MSB(Y_k) = 0 \\ 1 & \text{if } MSB(Z_k) = 1 \text{ and } MSB(Y_k) = 1 \end{cases}$$

$$\Lambda(s_{k,1}) = \sqrt{2}X_k + \beta\cdot Z_k,$$

$$\text{where } \beta = \begin{cases} 0 & \text{if } MSB(Z_k) = 1 \\ -1 & \text{if } MSB(Z_k) = 0 \text{ and } MSB(X_k) = 1 \\ 1 & \text{if } MSB(Z_k) = 0 \text{ and } MSB(X_k) = 0 \end{cases}$$

$\Lambda(S_{k,0})=Z_k$ where $\Lambda(S_{k,i})$ indicates a soft decision value corresponding to $S_{k,i}$ (i=0,1,2), and $S_{k,i}$ indicates an $i^{th}$ bit in a coded signal sequence mapped to a $k^{th}$ symbol.

3. An 8-ary PSK (Phase Shift Keying) demodulation apparatus for receiving an input signal $R_k(X_k, Y_k)$ comprised of a $k^{th}$ quadrature-phase component $Y_k$ and a $k^{th}$ in-phase component $X_k$, and for generating soft decision values $\Lambda(S_{k,0})$, $\Lambda(S_{k,1})$, and $\Lambda(S_{k,2})$ for the input signal $R_k(X_k, Y_k)$ by a soft decision means, comprising:

a calculator for calculating a soft value $Z_k$ by subtracting a level $|Y_k|$ of the quadrature-phase signal component $Y_k$ from a level $|X_k|$ of the in-phase signal component $X_k$ of the received signal $R_k(X_k, Y_k)$, and outputting the $Z_k$ as a first soft decision value;

a first selector for receiving the $Z_k$ from the calculator and an inverted value $-Z_k$ of the $Z_k$, and selecting the $Z_k$ or the $Z_k$ according to a most significant bit (MSB) of the quadrature-phase signal component $Y_k$;

a second selector for receiving the $Z_k$ from the calculator and the $-Z_k$, and selecting the $Z_k$ or the $Z_k$ according to an MSB of the in-phase signal component $X_k$;

a third selector for receiving an output of the second selector and a value "0", and selecting the output of the second selector or the value "0" according to an MSB of the $Z_k$;

a first adder for adding a value calculated by multiplying the quadrature-phase signal component $Y_k$ by $\sqrt{2}$ to an output of the third selector, and outputting a result value as a third soft decision value;

a fourth selector for receiving an output of the second selector and a value "0", and selecting the output of the second selector or the value "0" according to the MSB of the $Z_k$; and a second adder for adding a value calculated by multiplying the in-phase signal component $X_k$ by $\sqrt{2}$ to an output of the fourth selector, and outputting a result value as a second soft decision value.

4. An 8-ary PSK (Phase Shift Keying) demodulation method for receiving an input signal $R_k(X_k, Y_k)$ comprised of a $k^{th}$ quadrature-phase component $Y_k$ and a $k^{th}$ in-phase component $X_k$, and for generating soft decision values $\Lambda(S_{k,0})$, $\Lambda(S_{k,1})$, and $\Lambda(S_{k,2})$ for the input signal $R_k(X_k, Y_k)$ by a soft decision means, comprising the steps of:

(a) calculating a soft value $Z_k$ of a first demodulated symbol by subtracting a level $|Y_k|$ of the quadrature-phase signal component $Y_k$ from a level $|X_k|$ of the in-phase signal component $X_k$ of the received signal $R_k(X_k, Y_k)$;

(b) setting a first variable $\alpha$ to "0" if the soft value $Z_k$ has a positive value, setting the first variable $\alpha$ to "−1" if the $Z_k$ has a negative value and the quadrature-phase component $Y_k$ has a positive value, and setting the first variable $\alpha$ to "1" if the $Z_k$ has a negative value and the quadrature-phase component $Y_k$ has a negative value;

(c) determining a soft value of a third demodulated symbol by calculating $\sqrt{2}Y_k+\alpha^*Z_k$ using the quadrature-phase component $Y_k$, the soft value $Z_k$ and the first variable $\alpha$;

(d) setting a second variable $\beta$ to "0" if the soft value $Z_k$ has a negative value, setting the second variable $\beta$ to "−1" if the $Z_k$ has a positive value and the in-phase component $X_k$ has a negative value, and setting the second variable $\beta$ to "1" if the $Z_k$ has a positive value and the in-phase component $X_k$ has a positive value; and (e) determining a soft value of a second demodulated symbol by calculating $\sqrt{2}X_k+\beta^*Z_k$ using the in-phase component $X_k$, the soft value $Z_k$ and the second variable $\beta$.

\* \* \* \* \*